US012773751B2

(12) United States Patent
Nelson et al.

(10) Patent No.: US 12,773,751 B2
(45) Date of Patent: Oct. 27, 2026

(54) ADDITIVE MANUFACTURING WITH ROTATABLE DEPOSITION HEAD

(71) Applicant: Rolls-Royce Corporation, Indianapolis, IN (US)

(72) Inventors: Scott Nelson, Carmel, IN (US); Peter E. Daum, Fishers, IN (US); Quinlan Yee Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 431 days.

(21) Appl. No.: 16/797,718

(22) Filed: Feb. 21, 2020

(65) Prior Publication Data

US 2021/0260701 A1 Aug. 26, 2021

(51) Int. Cl.

| | |
|---|---|
| ***B23K 26/342*** | (2014.01) |
| ***B22D 23/00*** | (2006.01) |
| ***B23K 26/08*** | (2014.01) |
| ***B23K 26/14*** | (2014.01) |
| ***B28B 1/00*** | (2006.01) |
| ***B33Y 10/00*** | (2015.01) |
| ***B33Y 30/00*** | (2015.01) |
| ***B33Y 50/02*** | (2015.01) |

(52) U.S. Cl.

CPC .......... *B23K 26/342* (2015.10); *B22D 23/003* (2013.01); *B23K 26/083* (2013.01); *B23K 26/1462* (2015.10); *B23K 26/1464* (2013.01); *B28B 1/001* (2013.01); *B33Y 10/00* (2014.12); *B33Y 30/00* (2014.12); *B33Y 50/02* (2014.12)

(58) Field of Classification Search

CPC .............. B23K 26/083; B23K 26/1462; B23K 26/1464; B23K 26/342; B33Y 10/00; B33Y 30/00; B33Y 40/00; B33Y 50/02; B28B 1/001; B22D 23/003

USPC ..................... 700/119; 219/121, 76; 264/401

See application file for complete search history.

(56) References Cited

U.S. PATENT DOCUMENTS

| | | | | |
|---|---|---|---|---|
| 5,465,780 | A | 11/1995 | Muntner et al. | |
| 5,703,782 | A | 12/1997 | Dundorf | |
| 5,735,044 | A | 4/1998 | Ferrigno et al. | |
| 5,837,960 | A * | 11/1998 | Lewis | B23K 26/144 219/121.64 |
| 5,846,057 | A | 12/1998 | Ferrigno et al. | |
| 5,902,647 | A | 5/1999 | Venkataramani et al. | |
| 6,274,839 | B1 | 8/2001 | Stone et al. | |
| 6,494,960 | B1 | 12/2002 | MacDonald et al. | |
| 6,846,575 | B2 | 1/2005 | Hasz et al. | |

(Continued)

FOREIGN PATENT DOCUMENTS

| | | |
|---|---|---|
| BR | 102016026071 A2 | 5/2017 |
| BR | 102016026075 A2 | 5/2017 |

(Continued)

*Primary Examiner* — Woody A Lee, Jr.
*Assistant Examiner* — Abigail H Rhue
(74) *Attorney, Agent, or Firm* — Shumaker & Sieffert, P.A.

(57) ABSTRACT

A method for additive manufacturing, the method including delivering, via one or more delivery nozzles of a deposition head, a feedstock material to a substrate, wherein the delivered material defines a material distribution volume on and/or adjacent the substrate; and rotating the deposition head about an axis to control the material distribution volume, wherein the rotation of the deposition head adjusts a position of the one or more delivery nozzles of the deposition head relative to the substrate.

13 Claims, 4 Drawing Sheets

(56) References Cited

U.S. PATENT DOCUMENTS

| | | | |
|---|---|---|---|
| 7,060,365 | B2 | 6/2006 | Bruce |
| 8,267,683 | B2 | 9/2012 | Inoue |
| 8,699,001 | B2 | 4/2014 | Aoki |
| 9,566,665 | B2 | 2/2017 | Shuck |
| 9,681,920 | B2 | 6/2017 | Bowling et al. |
| 9,703,281 | B2 | 7/2017 | Shamoto |
| 9,858,657 | B2 | 1/2018 | Guy |
| 9,943,933 | B2 | 4/2018 | Xu et al. |
| 10,010,937 | B2 | 7/2018 | Bunker |
| 10,022,833 | B2 | 7/2018 | Sherbrooke et al. |
| 10,054,007 | B2 | 8/2018 | Todorovic |
| 10,072,506 | B2 | 9/2018 | Shuck |
| 10,208,374 | B2 | 2/2019 | Shen |
| 10,232,443 | B2 | 3/2019 | Myerberg et al. |
| 10,254,499 | B1 | 4/2019 | Cohen et al. |
| 10,322,470 | B2 * | 6/2019 | Jones .................... B33Y 10/00 |
| 10,324,448 | B2 | 6/2019 | Sato et al. |
| 10,350,684 | B2 | 7/2019 | Bunker |
| 10,406,760 | B2 | 9/2019 | Shuck et al. |
| 10,571,642 | B1 * | 2/2020 | Cohen .................. B29C 64/209 |
| 10,967,460 | B2 * | 4/2021 | Colin .................... B29C 64/153 |
| 2001/0008230 | A1 | 7/2001 | Keicher et al. |
| 2004/0017556 | A1 | 1/2004 | Nakahara et al. |
| 2004/0262261 | A1 | 12/2004 | Fink et al. |
| 2007/0037496 | A1 | 2/2007 | Habermann et al. |
| 2007/0205189 | A1 | 9/2007 | Grossklaus et al. |
| 2010/0062151 | A1 | 3/2010 | Tuppen et al. |
| 2010/0200189 | A1 | 8/2010 | Qi et al. |
| 2011/0053092 | A1 | 3/2011 | Aoki |
| 2014/0161520 | A1 | 6/2014 | Clark et al. |
| 2015/0183161 | A1 | 7/2015 | Molinari et al. |
| 2015/0329954 | A1 | 11/2015 | Quet et al. |
| 2017/0130585 | A1 | 5/2017 | Kray et al. |
| 2017/0173884 | A1 * | 6/2017 | Ryan ..................... B29C 64/118 |
| 2017/0239885 | A1 | 8/2017 | Knecht et al. |
| 2017/0301609 | A1 | 10/2017 | Menon et al. |
| 2017/0328207 | A1 | 11/2017 | Bunker |
| 2018/0003063 | A1 | 1/2018 | Doorbar |
| 2018/0111200 | A1 | 4/2018 | Bunker |
| 2018/0209280 | A1 | 7/2018 | Forsdike et al. |
| 2018/0221958 | A1 | 8/2018 | Torun et al. |
| 2018/0265971 | A1 * | 9/2018 | Spath ................ C23C 16/45517 |
| 2018/0297119 | A1 | 10/2018 | Clarke |
| 2018/0311822 | A1 | 11/2018 | Kaminka et al. |
| 2018/0349518 | A1 | 12/2018 | Byers et al. |
| 2019/0169966 | A1 * | 6/2019 | Boul ....................... B29C 64/10 |
| 2019/0202101 | A1 | 7/2019 | Tucker et al. |
| 2019/0224748 | A1 | 7/2019 | Barnhart et al. |
| 2019/0240781 | A1 | 8/2019 | Carter et al. |
| 2019/0309634 | A1 | 10/2019 | Itzel et al. |
| 2019/0314932 | A1 * | 10/2019 | De Chirico ........ B23K 26/0884 |
| 2019/0323352 | A1 | 10/2019 | Clark et al. |
| 2020/0331203 | A1 * | 10/2020 | Verma ................ B23K 20/1225 |

FOREIGN PATENT DOCUMENTS

| | | | |
|---|---|---|---|
| CA | 2696274 | A1 | 9/2011 |
| CA | 2906400 | C | 3/2019 |
| CN | 1592948 | A | 3/2005 |
| CN | 102483580 | B | 4/2015 |
| CN | 105388710 | A | 3/2016 |
| CN | 105954982 | A | 9/2016 |
| CN | 108602189 | A | 9/2018 |
| CN | 108663913 | A | 10/2018 |
| CN | 108698297 | A | 10/2018 |
| CN | 106756721 | B | 12/2018 |
| DE | 19957771 | A1 | 6/2001 |
| DE | 60029862 | T2 | 3/2007 |
| DE | 60030197 | T2 | 7/2007 |
| DE | 60318649 | T2 | 1/2009 |
| DE | 102008036450 | A1 | 2/2010 |
| EP | 0365195 | B1 | 5/1996 |
| EP | 0851098 | A2 | 7/1998 |
| EP | 1043480 | A2 | 10/2000 |
| EP | 1837417 | A2 | 9/2007 |
| EP | 2366476 | A1 | 9/2011 |
| EP | 2935641 | A1 | 10/2015 |
| EP | 2884057 | B1 | 4/2017 |
| EP | 3244013 | A | 11/2017 |
| EP | 2179816 | B1 | 4/2018 |
| EP | 2957376 | B1 | 2/2019 |
| EP | 3059039 | B1 | 4/2019 |
| EP | 3045254 | B1 | 5/2019 |
| FR | 3037832 | A1 | 12/2016 |
| JP | 2007013240 | A | 2/2009 |
| JP | 4301402 | B2 | 7/2009 |
| JP | 2019094546 | A | 6/2019 |
| WO | 2016058900 | A2 | 4/2016 |
| WO | 2019003607 | A | 1/2019 |
| WO | 2019005467 | A2 | 1/2019 |
| WO | 2019018832 | A2 | 1/2019 |
| WO | 2019094264 | A1 | 5/2019 |
| WO | 2019094273 | A1 | 5/2019 |
| WO | 2019094294 | A1 | 5/2019 |
| WO | 2019147378 | A1 | 8/2019 |

* cited by examiner

ADDITIVE MANUFACTURING WITH ROTATABLE DEPOSITION HEAD

TECHNICAL FIELD

The disclosure relates to additive manufacturing systems and techniques.

BACKGROUND

Additive manufacturing may generate three-dimensional structures through addition of material layer-by-layer or volume-by-volume to form the structure, e.g., rather than removing material from an existing volume to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

The disclosure describes example techniques, systems, and materials for additive manufacturing to form and/or repair components, such as components in a high temperature mechanical system. The additive manufacturing techniques may include directed energy deposition such as laser blown powder and wire fed directed energy deposition processes.

In some examples, the disclosure describes a method for additive manufacturing, the method comprising delivering, via one or more delivery nozzles of a deposition head, a feedstock material to a substrate, wherein the delivered material defines a material distribution volume on and/or adjacent the substrate; and rotating the deposition head about an axis to control the material distribution volume, wherein the rotation of the deposition head adjusts a position of the one or more delivery nozzles of the deposition head relative to the substrate.

In some examples, the disclosure describes an additive manufacturing system comprising an energy delivery device; a deposition head including one or more delivery nozzles configured to deliver a feedstock material; and a computing device, wherein the computing device is configured to control the deposition head to deliver a feedstock material to a substrate via the one or more delivery nozzles, wherein the delivered material defines a material distribution volume on and/or adjacent the substrate; and control rotation of the deposition head about an axis to control the material distribution volume, wherein the rotation of the deposition head adjusts a position of the one or more delivery nozzles of the deposition head relative to the substrate.

The details of one or more examples are set forth in the accompanying drawings and the description below. Other features, objects, and advantages will be apparent from the description and drawings, and from the claims.

DETAILED DESCRIPTION

Figure 1A:
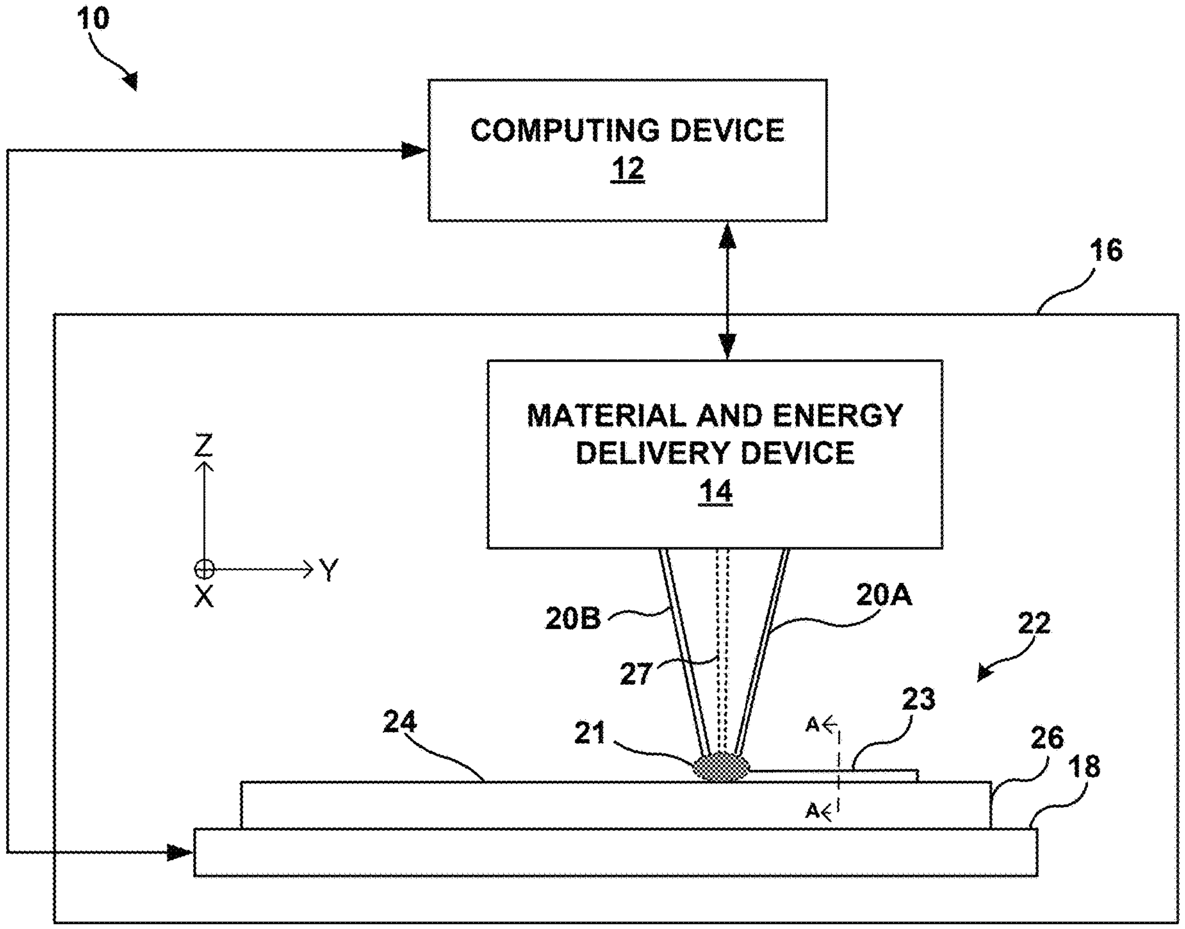
FIG. 1A is a conceptual block diagram illustrating an example directed energy deposition system for additive manufacturing to form or repair an example component using a rotatable deposition head.

The disclosure generally describes systems and techniques for additively manufacturing to form and/or repair components, such as components in a high temperature mechanical system. The additive manufacturing techniques may include directed energy deposition processes such as laser blown powder processes, filament delivery processes, or the like. The additive manufacturing systems and techniques may be employed to fabricate original components and/or repair components (e.g., original components that have been damaged).

During a directed energy deposition process such as a laser blown powder process, a deposition head may deliver a feedstock material in the form of a powder via one or more deposition nozzles (also referred to as delivery nozzles or delivery ports) to a surface of a substrate (e.g., a build surface or previously deposited material). The powder may be "blown" from the deposition nozzle(s) by a carrier gas to define a material distribution volume (referred to in some examples as a "powder cloud") on or adjacent to the surface of the substrate. In some examples, the deposition head may be moveable relative to the surface of the substrate in three-dimensions along orthogonal x, y, and z-axes (e.g., with z-axis movement adjusting the working distance between the deposition head and underlying substrate surface). During the delivery of material, the deposition head may be moved relative to the substrate along a toolpath (e.g., by moving the deposition head with the substrate being in a stationary position or vice versa). A directed energy source such as a laser may melt the substrate surface and/or delivered feedstock powder to form a melt pool on and/or adjacent to the surface, after which the melted feedstock material is cooled to form a track of the feedstock material. A plurality of tracks may be deposited using such a technique in a three-dimensional space (e.g., stacked vertically and/or horizontally) to build the additively manufactured component.

The focus and shape of the deposited feedstock material (e.g., the focus and shape of the material distribution volume or "powder cloud") may be an important consideration to achieve both microstructural and geometric requirements of a repair or original equipment manufacturer (OEM) process. As one example, a deposition head includes four powder deposition nozzles evenly spaced around the center axis of the deposition head. In some examples, a laser used to melt the substrate surface material and/or the deposited powder may be emitted from a position along approximately the central axis of the deposition head (e.g., equidistant from the four powder deposition nozzles). The powder deposition nozzles may be angled so that the centers of the delivered powder streams substantially converge with the laser at a set focus point. In some examples, it may be advantageous to set the working distance (e.g., the separation of the deposition head and the deposited component) lower than the focal distance (e.g., the distance between the powder focal point and the deposition head), which results in four separate powder streams entering the melt pool generated by the laser.

While such a configuration may allow for some flexibility in addressing potential overbuild and/or underbuild issues (e.g., with regard to height or thickness of the tracks being formed) with the additive manufacturing process, it also may cause an asymmetrical mass capture by the melt pool. For example, using a deposition head with four deposition nozzles located at 45, 135, 225, and 315 degree positions, respectively, around the center axis of the deposition head (which may be referred to as a straddling position relative to the toolpath) may cause asymmetrical mass capture by the melt pool. Conversely, a deposition head with four deposition nozzles located at 0, 90, 180, and 270 degree positions, respectively, around the center axis of the deposition head (which may be referred to as a diamond position relative to the toolpath) may not result in asymmetrical mass capture by the melt pool. However, a single orientation of nozzles relative to the center axis may not be suitable for components being built with complex geometries. In such cases, it may not be practical or possible to substitute deposition heads during the additive manufacturing process. Moreover, movement of the substrate onto which the material is being deposited to change the orientation of the deposition nozzles may not be practical, particularly in instance in which a relatively large component is being repaired or built.

In accordance with examples of the disclosure, systems and techniques are described in which a deposition head of a directed energy deposition manufacturing device is rotatable about an axis (e.g., around the z-axis) of the deposition head. The rotation of the deposition head may allow for control over the distribution of the feedstock material delivered by one or more delivery nozzles of the deposition head, which is melted by the directed energy source (e.g., laser). In some examples, the distribution of the feedstock material that is delivered by the one or more delivery nozzles may be referred to as the material distribution volume. The rotation of the deposition head about the axis may adjust the position of the one or more delivery nozzles, e.g., relative to the surface of the underlying substrate and/or directed energy device, which may allow for better control over the track resulting from the melted feedstock material. In some examples, the rotation of the deposition head about the axis may adjust the position of the one or more delivery nozzles of the deposition head relative to the toolpath (e.g., an instantaneous vector representing the direction of travel of the deposition head along toolpath at a given moment in time). For example, the position (e.g., radial position) of the one or more delivery nozzles of the deposition head may be maintained at substantially the same position relative to the toolpath vector (e.g., when the overall toolpath is linear or non-linear) or the position may be adjusted relative to the toolpath vector by rotating the deposition head.

In some examples, the deposition head may be rotated in addition to movement of the deposition head relative to the build surface in the x, y, and/or z-axis. In some examples, the rotation of the deposition head may be carried out while feedstock material is being delivered via the one or more delivery nozzles and/or while feedstock material is not being delivered, e.g., during a pause in the feedstock delivery. Similarly, the deposition head may be rotated while the deposition head is moving along a toolpath (e.g., moving relative to the underlying substrate) or while the deposition head is substantially stationary (e.g., not moving relative to the underlying substrate). The deposition head may be configured to rotate 360 degrees, more than 360 degrees or less than 360 degrees about the axis.

In some examples, the axis of rotation of the deposition head may be substantially parallel or parallel to the delivery axis of the laser energy or energy from another directed energy source. In some examples, the axis of rotation of the deposition head may be substantially orthogonal to the build surface of the underlying substrate and/or to the toolpath of the deposition head. In some examples, the axis of rotation of the deposition head may be the central or longitudinal axis of the deposition head. In some examples, the axis of rotation of the deposition head may be substantially parallel or parallel to z-axis movement of the deposition head, e.g., where the z-axis is substantially orthogonal to the x-y plane of movement of the deposition head.

Examples of the disclosure may allow for one or more benefits. For example, compared to example deposition heads that may move only in the x, y, and/or z-axes, some examples of the disclosure allow the powder delivery nozzle(s) on a deposition head to rotate about an axis, such as the delivery axis of laser energy, to dynamically adapt the nozzle position to the geometry of the deposition. As the head travels in the x-y axis, the delivery nozzle(s) of the deposition head may be able to rotate about the z-axis and maintain relative alignment with the x-y moves. As one example, for a non-linear toolpath, the deposition head may be rotated about the central or z-axis to maintain the orientation of the delivery nozzle(s) relative to the non-linear toolpath, e.g., to maintain a substantially constant material distribution volume of the delivered feedstock material. In examples in which the deposition head is configured to deliver a feedstock material in the form of a wire or filament (e.g., as compared to a powder), the deposition head may be rotated about an axis (e.g., z-axis) to consistently feed the wire or filament in a "pushing" or "pulling" configuration (also referred to as a "leading" or "lagging" configuration), which may be advantageous to weld quality.

Figure 1B:
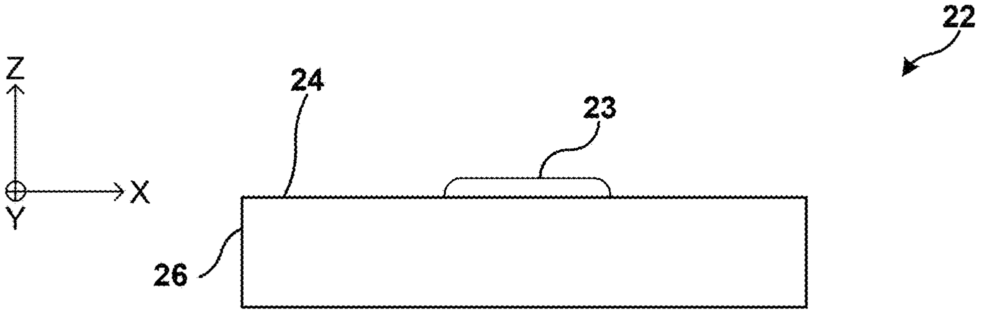
FIG. 1B is a schematic diagram illustrating a cross-section view of a portion of the example component of FIG. 1A.

FIG. 1A is a conceptual block diagram illustrating an example direct energy deposition additive manufacturing system 10 for additive manufacturing to form or repair component 22. FIG. 1B is a schematic diagram illustrating a partial view of component 22 of FIG. 1A along cross-section A-A. System 10 includes a computing device 12, material and energy delivery device 14, an enclosure 16, a stage 18, and component 22.

Computing device 12 may include, for example, a desktop computer, a laptop computer, a workstation, a server, a mainframe, a cloud computing system, a tablet, a smart phone, or the like. Computing device 12 is configured to control operation of additive manufacturing system 10, including, for example, material and energy delivery device 14, and/or stage 18. Computing device 12 may be communicatively coupled to material and energy delivery device 14, stage 18, or both using respective communication connections. During an additive manufacturing process, computing device 12 may control the motion of the one or more deposition heads of material and energy delivery device 14 relative to stage 18 (e.g., by moving stage 18 and/or the one or more deposition heads), control material delivery from the one or more deposition heads of material and energy delivery device 14, and/or control the delivery of directed energy from material and energy delivery device 14. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Component 22 may include any structure formed by additive manufacturing or to which material is added using additive manufacturing, e.g., where the added material is used to repair a damaged portion of component 22. Component 22 may include structural features and geometry of any size and/or shape. In some examples, component 22 may include a component of a mechanical system, a shaft, a gear, a bearing component, or transmission component. In some examples, component 22 may be a component of a high temperature mechanical system such as a gas turbine engine. In some examples, component 22 may be an airfoil or other turbine engine components such as rings, casing, segments, and the like.

Component 22 may be formed of any material to which material may be added using directed energy deposition additive manufacturing. In some examples, component 22 may be formed of a metal, metal alloy, and/or ceramic material. For example, component 22 may be formed of one or more of titanium, nickel, cobalt, iron, aluminum, magnesium (and alloys thereof) and/or ceramics such as aluminum oxide.

Component 22 may be fabricated using any suitable technique for manufacturing metal, metal alloy, and/or ceramic components. In one example, component 22 may be fabricated using directed energy deposition additive manufacturing, e.g., with system 10. Additive manufacturing may be used to deposit a plurality of layers of a material, each layer of the plurality of layers having a predetermined two-dimensional geometry. Each layer may be formed by a one or more tracks or beads of material, as described further below. The plurality of layers may be stacked to provide a predetermined three-dimensional geometry to component 22 by material addition. While additive manufacturing may be used to fabricate component 22, additive manufacturing may also be used to modify or repair component 22, for example, a damaged part of component 22. In some examples, component 22 may be fabricated using at least one of casting, molding, stamping, cutting, punching, milling, etching, welding, or other metal working techniques.

Damage to component 22, for example, damage that affects geometry or mechanical properties of features or regions of component 22, may affect the performance of component 22 as a whole, and thus may need to be repaired. In some examples, even if component 22 is not damaged, component 22 may be modified due to changes in specifications or design parameters, restoration of component features that are configured to wear during its operating life, and/or because of changes in the environment in which component 22 is to be deployed. Additive manufacturing may be used to repair or modify component 22.

In some examples, component 22 includes substrate 26. For example, substrate 26 may define a portion of component 22. For example, where substrate 26 defines a damaged portion of component 22. In other examples, substrate 26 may define a build plate on stage 18 on which component 22 is built. For example, where component 22 is formed on a support structure defined by substrate 26. In some examples, system 10 may not include a separate substrate 26, and softened or melted filler material 20 may be deposited on a build surface defined by stage 18, or on another component, or on layers of prior deposited, softened, or melted filler material 20 or another material.

In some examples, computing device 12 may be configured to control a position or movement of stage 18, substrate 26, or both, relative to material and energy delivery device 14. For example, computing device 12 may control movement of stage 18 in one or more axes (e.g., three orthogonal axes (e.g., the x, y, and/or z axes shown in FIG. 1A) along which stage 18 can translate, five axes along which stage 18 can translate and rotate, six axes along which stage 18 can translate and rotate, or the like). Additionally, or alternatively, computing device 12 may be configured to control the movement of material and energy delivery device 14, e.g., by moving a deposition head of material and energy delivery device 14 in one or more axes (e.g., the three orthogonal axes x, y, and/or z shown in FIG. 1A). As described further below, computing device 12 may additionally or alternatively rotate the deposition head of material and energy delivery device 14 about an axis such as the z-axis, e.g., to control the material distribution volume 21.

Computing device 12 may be configured to control the delivery of feedstock material 20A and 20B (collectively feedstock material 20) to surface 24 of substrate 26. For example, material and energy delivery device 14 may include one or more delivery nozzles configured to deliver feedstock material 20 to surface 24 or a location of component 22 being formed. In the example of FIG. 1A, material and energy delivery device 14 may have two separate delivery nozzles (not shown), with a first delivery nozzle for delivering feedstock material 20A and a second delivery nozzle for delivering feedstock material 20B. In other examples, material and energy delivery device 14 may have a single delivery nozzle or more than two delivery nozzles. Computing device 12 may control the position and orientation of material and energy delivery device 14 and/or a flux of feedstock material 20, for example, by controlling an industrial robot, a movable platform, or a multi-axis stage that supports material and energy delivery device 14.

Figure 2:
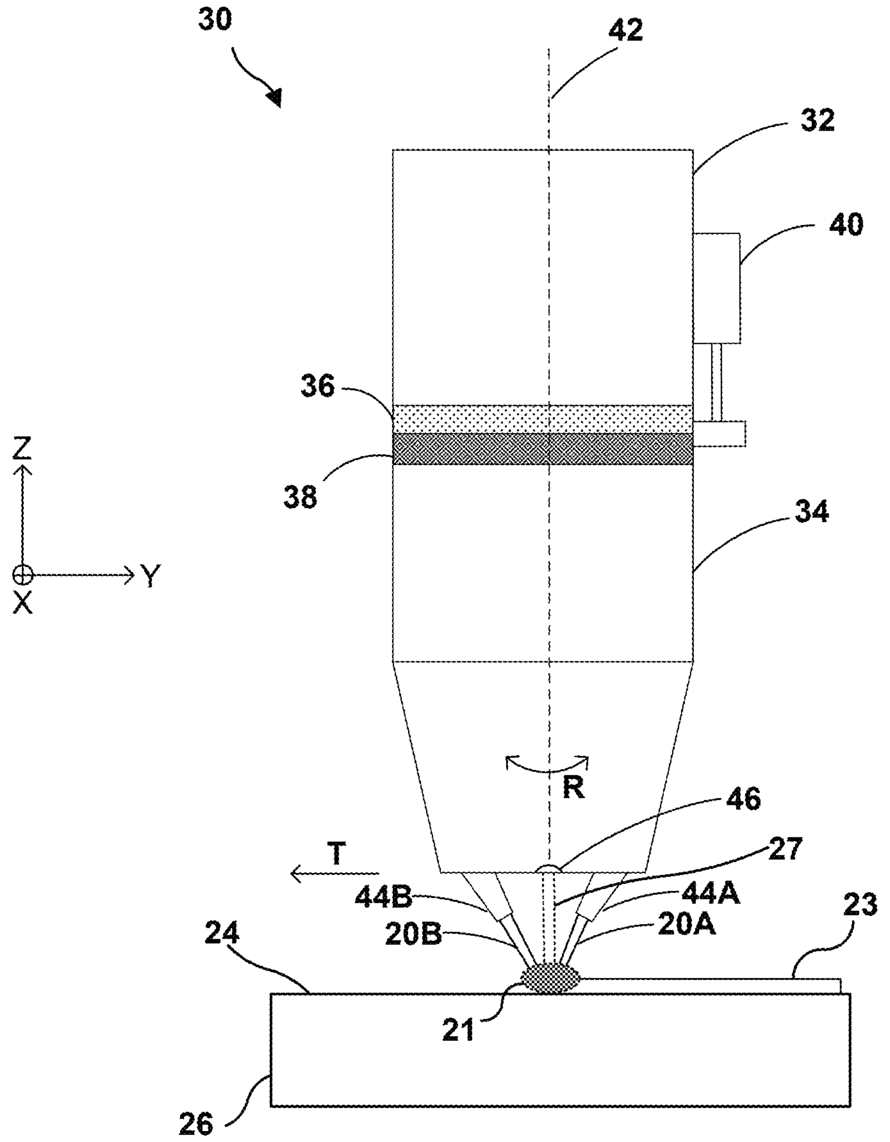
FIG. 2 is a schematic diagram of an example rotatable deposition head for a directed energy deposition process.

For ease of description, the structure of a rotatable deposition head that includes an opening or port out of which feedstock material 20 is delivered towards substrate 26 is primarily referred to in the disclosure as a delivery nozzle. For example, material and energy deposition head 14 is described below as including two or more delivery nozzles for delivering two sources of feedstock material 20 to substrate 26. Example deposition head 30 shown in FIG. 2 is described as including deposition nozzles 44A and 44B. In some examples, delivery nozzles 44A and 44B may have a substantially cylindrical or conical form, such as that shown in FIG. 2, having an outlet out of which the feedstock material is directed for delivery towards substrate 26. However, examples of the disclosure may include delivery nozzles in forms other than delivery nozzles having a substantially cylindrical or conical nozzle shape. In some examples, an example delivery nozzle may be defined by an opening or orifice at a portion (e.g., a substantially planar surface) of the deposition head, where a feedstock material (e.g., in the form of a powder or wire) exits out of the deposition head and is directed or otherwise delivered towards surface 24 of substrate 26, e.g., into a melt pool. The delivered material may be melted and then solidified to form a track 23 on the substrate 26 during the additive manufacturing process.

Feedstock material 20 may include a metal, alloy, and/or ceramic material. The metal, alloy, and/or ceramic of the feedstock material 20 may be supplied by material and energy delivery device 14 in a powder form or a wire form (which may also be referred to a filament or wire filament). During or after delivery of feedstock material 20 to surface 24, energy 27 delivered by material and energy delivery device 14 may heat substrate 26 and/or feedstock material 20 to form a melt pool on surface 24 and/or soften or melt at least a portion of feedstock material 20 to join at least some of feedstock material 20 to substrate 26. In some examples, feedstock material 20 (e.g., the metal, alloy, and/or ceramic of feedstock material 20) may include a composition substantially the same as (e.g., the same or nearly the same as) the composition of the material from which component 22 is formed. In other examples, feedstock material 22 may include a composition different from the composition of the material from which component 22 is formed.

In some examples, system 10 may be a blown powder directed energy deposition additive manufacturing system. For example, material and energy delivery device 14 may deliver powdered feedstock material 20A and 20B adjacent to surface 24 by blowing the powder adjacent to surface 24. In some examples, powdered feedstock material 20 may be blown as a mixture of the powder with a gas carrier. Thus, in some examples, material and energy delivery device 14 may be fluidically coupled to a powder source and a gas source. In some examples, the carrier gas may include an inert gas. Material and energy delivery device 14 may include one or more delivery nozzles for directing powdered feedstock material 20A, 2B to the location of component 22 being formed by melting of the powdered feedstock material 20 by delivered energy 27.

In some examples, computing device 12 may control a powder/feedstock feed rate and/or standoff distance of material and energy delivery device 14. In some examples, flux into a melt pool is primarily a function of feed rate but flux may be indirectly controlled by standoff distance. Standoff distance may include a distance from the lowest point of a delivery nozzle parallel to the gravitational vector to the surface of component 22. In some examples, a powder delivery nozzle standoff distance may influence filler material 20 flux falling on a given area of the molten pool per unit time, as the powder stream exiting the delivery nozzle may diverge as the powder exits the nozzle. In some examples, the powder delivery nozzle standoff distance may be between about 0.05 inches and about 4 inches. In some examples, the powder feed rate may be maintained between about 0.1 g/min and about 20 g/min. For example, the delivery standoff distance may depend on the angle of the stream of feedstock material 20 symmetry axis relative to the surface of component 22, the powder delivery nozzle exit hole diameter, and/or the angle of divergence of the streams of feedstock material 20 exiting the powder delivery nozzle. In some examples, material and energy delivery device 14 may include a plurality of nozzles such that filler material 20 having a converging profile is delivered by material and energy delivery device 14. For example, each nozzle of the plurality of nozzles may be substantially directed towards a target delivery zone.

In some examples, system 10 may include a wire filament directed energy deposition additive manufacturing system. For example, material and energy delivery device 14 may include one or more reels or reservoirs holding wire filler material 20 configured to deliver wire feedstock material 20 on to surface 24 of substrate 26. In examples in which the material delivery devices include a filament reel, computing device 12 may control material and energy delivery device 14 to advance the respective filament of wire feedstock material 20 from the reel and heat the respective filament to above a softening or melting point of the composition. In some examples in which the feedstock material 20 is in the form of a wire filament, material and energy delivery device 14 may only have a single delivery nozzle (e.g., a single delivery port or other wire filament delivery member). In the example of FIG. 1, the wire may be delivered from a location in advance of the leading edge of track 23 (e.g., with the wire represented as feedstock material 20B in FIG. 1 or FIG. 2) or behind the leading edge of track 23 (e.g., with the wire represented as feedstock material 20A in FIG. 1 or FIG. 2).

Regardless of the type of material delivery device 14, material and energy delivery device 14 is configured to deliver feedstock material 20 to surface 24 of substrate 26. Feedstock material 20 that is delivered to substrate 40 may define a material distribution volume 21. In the case of a blown powder directed energy deposition system, material distribution volume may correspond to the powder cloud formed from the delivery of feedstock material 20. In the case of wire filament directed energy deposition, material distribution volume may correspond to the wire that is melted, including the direction the wire is "pushed" or "pulled" by the deposition head, e.g., relative to the toolpath travel direction.

In some examples, all or only a portion of the feedstock material 20 forming material distribution volume may be melted indirectly or directly by directed energy 27 to form track 23 upon cooling. In some cases, such as blown powder directed energy deposition, a portion of feedstock material 20 that defines material distribution volume 21 may not melt and/or otherwise form a portion of track 23 but instead may be lost or recycled during the deposition process. In some examples, the shape, size, and/or relative concentration of feedstock material 20 of material distribution volume 21 may be controlled, e.g., to control the resulting shape, size, and/or other properties of track 23. As described below, it may be beneficial to control material distribution volume 21 to prevent underbuild, overbuild, or asymmetrical build of track 23 during a directed energy deposition process. In some examples, computing device 12 may control the flux of feedstock material 20, position of the delivery nozzles relative to surface 24 and/or directed energy 27, and/or other processing parameters to control one or more properties of track 23 resulting from the deposition process. For example, as described above, computing device 12 may move the deposition head of material and energy delivery device 14 relative to surface 24 along one or more of the x, y, and z-axes shown in FIG. 1A to control material deposition volume 21 and, thus, control track 23 resulting from the melting of feedstock material 20 from material deposition volume 21.

As described herein, material and energy deposition device 14 may include one or more deposition heads that are rotatable about an axis (e.g., the z-axis). The rotation of the deposition head(s) about the axis may be used to control the position of the one or more delivery nozzles of the deposition head(s) that deliver feedstock material 20. By employing such rotatable deposition head(s), computing device 12 may be control one or more properties of track 23 formed by the directed energy deposition process. For example, for a non-linear toolpath, the deposition head may be rotated about the z-axis to maintain the relative position of the delivery nozzle(s) of the deposition head to the toolpath. This may allow for a substantially constant build of track 23 despite the non-linear path by maintaining a substantially constant material distribution volume 21. In other examples, computing device 12 may be configured to rotate the deposition head about the z-axis to change the material distribution volume 21, e.g., to change one or more properties of track 23 such as the shape or size of track 23.

Material and energy delivery device 14 may include source of energy 27, such as a laser source, an electron beam source, plasma source, or another source of energy 27 that may be absorbed by feedstock material 20 to be added to component 22, e.g., to melt feedstock material 20. Example laser sources include a CO laser, a $CO_2$ laser, a Nd:YAG laser, or the like. In some examples, material and energy delivery device 14 may be selected to deliver energy with a predetermined wavelength or wavelength spectrum that may be absorbed by feedstock material 20 to be added to component 22 during the additive manufacturing technique. In some examples, material and energy delivery device 14 includes an energy delivery head (not shown), which is operatively connected to material and energy delivery device 14. The energy delivery head may aim or direct energy 27 toward predetermined positions adjacent to component 22 during the additive manufacturing technique. Computing device 12 may control various parameters of material and energy delivery device 14, including the instantaneous power, peak power or intensity, power pulsing, average beam power, a peak beam power density, a beam heat input, travel speed, wavelength, direction, and orientation of the energy delivery head.

While material and energy delivery device 14 is shown as a single device, in other examples, multiple devices may be employed to provide the functionality described for material and energy delivery device 14. For example, system 10 may include an energy delivery device configured to delivery directed energy 27 that is separate from a material delivery device configured to deliver feedstock material 20.

In some examples, system 10 includes enclosure 16, which at least partially encloses material and energy delivery device 14, stage 18, and substrate 26. Enclosure 16 may provide physical protection to material and energy delivery device 14, stage 18, and substrate 26 during operation of additive manufacturing system 10, may maintain an atmosphere within enclosure 16 in a desired state (e.g., filled with an inert gas, or maintained at a desired temperature), or the like. In some examples, enclosure 16 may define a furnace or another thermal chamber or environment in which any predetermined temperature may be maintained. For example, enclosure 16 may include thermally insulative walls, and material and energy delivery device 14 within enclosure 16 may provide a source of heat to cause an interior of enclosure 16 to be heated to the predetermined temperature. The source of heat may include, for example, one or more heating elements or coils may be disposed in or on walls of enclosure 16 to cause an interior of enclosure 16 to be heated to the predetermined temperature. The predetermined temperature may be controlled to control a cooling rate of the deposited feedstock material 20.

Computing device 12 is configured to control deposition of feedstock material 20 onto surface 24 to form tracks 23 on surface 24. Computing device 12 may control movement of material and energy delivery device 14, stage 18, or both, based on a computer aided manufacturing or computer aided design (CAM/CAD) file, for example, to trace a pattern or a shape to form a layer including tracks 23. For example, directed energy 27 may transform one or more of a physical state, a composition, ionization, or another property of one or both of substrate 26 and feedstock material 20 along the first path leading to the deposition of track 23 on surface 24. In some examples, energy 27 may melt surface 24 of substrate 26 along the first path to form a molten portion or molten pool. Material and energy delivery device 14 may deliver feedstock material 20 to the molten portion, where the material may melt in the molten portion to form a combined molten composition, which may solidify to form track 23. Thus, energy 27 may transform material from feedstock material 20 into a sintered, fused, or molten state by contact with the molten pool. In some examples, energy 27 may be directly incident on a portion of feedstock material 20 and may directly fuse or melt the portion of feedstock material 20 before it is deposited on surface 24. In some examples, material from one or both of feedstock material 20 or substrate 26 may only melt or fuse within a focal region or substantially near a focal region of energy 27. For example, material and energy delivery device 14 may deliver feedstock material 20 along a first path, and computing device 12 may focus energy 27 from energy source onto component 22 and feedstock material 20, so that component 22 and feedstock material 20 along the first path simultaneously melt to form a molten region. Thus, in some examples, track 23 may be formed substantially along the first path.

After computing device 12 has controlled material and energy delivery device 14 to deposit one or more layers of additively manufactured component 22 (e.g., from a plurality of adjacent tracks 23), or after the complete component 22 is formed by additive manufacturing, the component may be subjected heat treatment. In some examples, heat treatment may include one or more of a bulk heat treatment or a localized heat treatment configured to provide selected material properties. Bulk heat treatments may include but are not limited to stress relieving, solutioning, aging (e.g., precipitation aging), carburizing, nitriding, austenitzing, quenching, stabilizing, and tempering. Localized heat treatments may include but are not limited to induction hardening or directed laser hardening. In some examples, heat treating may include sintering, e.g., a two-step heating process, each step of the two-step heating process selected based on a composition of feedstock material 20. In some examples, heat treatment may be selected based on a criticality of the rebuilt area to its application, necessary material properties after repair, and tolerance of component 22, e.g., substrate 26, to distortion that may occur during a repair process.

In some examples, after deposition of feedstock material 20 and optional heat treatment, component 22 may be machined, plated, or coated (e.g., via thermal spraying) to restore properties, dimensional conformance to component 22, surface finish conformance to component 22, or both. For example, machining, plating, or coating may be used to define a final shape of component 22. Surface finishing, such as, for example, shot peening, laser shock peening, and isotropic super-finishing, may provide a finished surface on component 22.

As described above, material and energy deposition device 14 may include a deposition head including one or more feedstock delivery nozzles. FIG. 2 is a schematic diagram of an example material and energy deposition head 30 (also referred to as "deposition head 30). Deposition head 30 may be employed for material and energy deposition device 14 of system 10 and function as described above for material and energy deposition device 14. For ease of illustration, deposition head 30 is described with regard to a laser being employed to delivery directed energy to melt the delivered feedstock material. However, it is recognized that other directed energy sources may be employed. Additionally, deposition head 30 constitutes an example in which the directed energy head is combined with the material deposition head. However, it is recognized that a material deposition that rotates in the manner described may be separate from the directed energy head (e.g., where the material deposition head is positioned adjacent to the directed energy head). Further, for ease of description, the example deposition head 30 is described as being configured to deliver a powder feedstock material (e.g., as in the case of a laser blown powder additive manufacturing process). However, it is contemplated that deposition head 30 may be configured to deliver a feedstock material in a different form such as a wire or filament.

As shown in FIG. 2, deposition head 30 includes laser head 32 and material deposition head 34. Material deposition head 34 includes delivery nozzles 44A and 44B positioned radially about central axis 42 of deposition head 30. Delivery nozzles 44A and 44B are configured to deliver feedstock material 20A and 20B, respectively, towards surface 24 of substrate 26, e.g., by angling delivery nozzles 44A and 44B towards central axis 42. Directed energy 27 in the form of a laser generated by laser head 32 may be delivered through material deposition head 34 via laser aperture 46. As configured in FIG. 2, directed energy 27 is delivered towards surface 24 of substrate 26 along an axis substantially perpendicular to central axis 42 of deposition head 30. In some examples, central axis 42 and/or the delivery axis of directed energy 27 may be substantially orthogonal to the plane of surface 24 of substrate 26 during an additive manufacturing process while in other examples, central axis 42 and/or the delivery axis of directed energy 27 may be non-orthogonal to the plane of surface 24.

As described above with regard to material and energy deposition head 14, when delivered, the powder streams of feedstock material 20A and 20B define material deposition volume 21. Deposition head 30 move relative to substrate 26 along toolpath T during the deposition process in a continuous or periodic manner, e.g., while feedstock materials 20A and 20B are being delivered. Toolpath T may be substantially parallel or non-parallel to the plane of surface 24. Directed energy 27 melts the delivered feedstock materials 20A and 20B, e.g., at material deposition volume 21 to form a melt pool, which then cools to solidify on surface 23 to form track 23.

During the additive manufacturing process, deposition head 30 may be moved relative to substrate 26 in one, two, or three dimensions. For example, deposition head 30 (including directed energy head 32 and deposition head 34) may be moved in one or more of the x, y, and z axes as labelled in FIG. 2. Such movement may be carried out by keeping substrate 26 stationary and moving deposition head 30, keeping deposition head stationary and moving substrate 26, and/or moving both deposition head 30 and substrate 26. In some examples, laser head 32 may be describes as having three degrees of freedom during the additive manufacturing process.

In some examples, computing device 12 (FIG. 1A) may control the movement of deposition head 30 in one or more of the x, y, and z axes as labelled in FIG. 2 to control one or more parameters of track 23 resulting from the additive manufacturing process, e.g., to control the resulting size, shape, and/or path of track 23. In some examples, computing device 12 may control the movement of deposition head 30 in one or more of the x, y, and z axes as labelled in FIG. 2 to control the size, shape, and/or other parameters of material distribution volume 21. Based on the angled nature of nozzles 44A and 44B, movement of deposition head 30 along the z-axis may allow for the working distance (e.g., the separation between the outlets of nozzles 44A, 44B and surface 24) to change. In some examples, computing device 12 may control the position of deposition head 40 along the z-axis such that the working distance is the same, less, or greater than the focal distance (e.g., the distance between the powder focal point and the outlets of nozzles 44A, 44B).

In addition to, or as an alternative to moving deposition head 30 in one or more of the x, y, and z axes as labelled in FIG. 2, material deposition head 34 may be configured to rotate about axis 42 (e.g., as indicated by direction of rotation R in FIG. 2). In the example of FIG. 2, axis 42 corresponds to the central or longitudinal axis of material deposition head 34. Additionally, in the example of FIG. 2, axis 42 corresponds to the delivery axis of directed energy 27 from laser head 32 via aperture 46. Additionally, axis 42 corresponds to an axis that is substantially orthogonal to toolpath T. As described above, toolpath T may be substantially parallel or nonparallel to surface 24 of substrate 24.

Material deposition head 34 may be configured to rotate about axis 42 greater than, less than, or approximately equal to 360 degrees. Computing device 12 may rotate material deposition head 34 to control material distribution volume 21. Rotation of material deposition head 34 may change the radial position of delivery nozzles 44A and 44B relative to axis 42. For example, in the configuration shown in FIG. 2, delivery nozzle 44B may be considered to be a zero-degree position using axis 42 and toolpath T as reference points with delivery nozzle 44A considered to be at a 180-degree position. Computing device 12 may control material deposition head 34 to rotate +90 degrees about axis 42 from such a position so that nozzle 44B is at a 90-degree position and nozzle 44A is at a 270-degree position (e.g., so that delivery nozzles "straddle" toolpath T). From that point, computing device 12 may control material deposition head 34 to rotate another +90 degrees about axis 42 from such a position so that nozzle 44B is at the 180-degree position and nozzle 44A is at the zero-degree position. Based on the ability of material deposition head 34 to rotate in such manner as well as being movable along the x, y, and z axes, material deposition head 34 may be considered to have four degrees of freedom in its movement.

Material deposition head 34 may be configured in any suitable manner to allow for the rotation in the manner described herein. For example, as shown in FIG. 2, material deposition head 34 is coupled to laser head 32 by bearing(s) 36 and geared collar 38. Geared collar 38 is operationally coupled to drive motor 40. Drive motor 40 may be an electrical motor or other motor that functions are described herein. Under the control of computing device 12, drive motor 40 may drive one or more gears of geared collar 38 to rotate material deposition head 34 about axis 42. Bearing(s) 36 may allow for material deposition head 34 to be selectively rotated about axis 42 under the control of computing device 12 while laser head 32 does not rotate. The material feedlines that supply nozzles 44A and 44B may be coupled to external feedstock source(s) through any suitable technique, such as, flexible tubing and/or differential diametric channels, that allow the nozzles 44A and 44B to be supplied with feedstock material from the sources while deposition head 34 is rotated as described herein.

Figure 3:
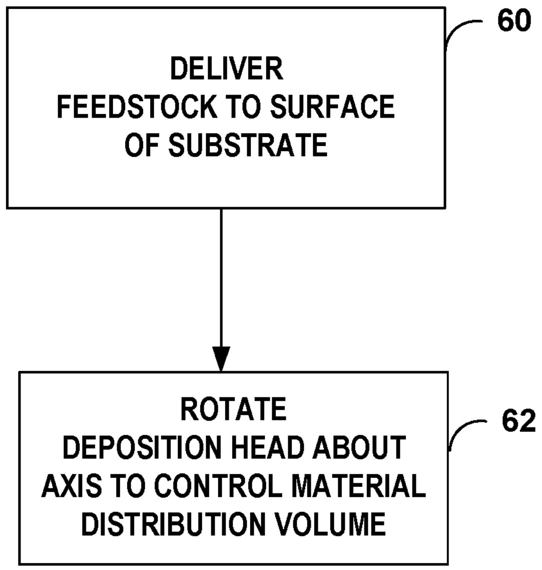
FIG. 3 is a flow diagram illustrating an example technique for a directed energy deposition process using a rotatable deposition head.

FIG. 3 is a flow diagram illustrating an example technique for additive manufacturing using a rotatable material deposition head. The example technique of FIG. 3 may be performed by example system 10 of FIG. 1A, and is described in some examples below with reference to example system 10 of FIG. 1A. However, in some examples, one or more steps of the example technique of FIG. 3 may be performed by other example systems described in the disclosure. For ease of description, the technique of FIG. 3 is described with regard to deposition head 30 under the control of computing device 12. However, it is contemplated that such an example technique may be carried out by any deposition head configured to rotate about an axis in the manner described herein.

The technique illustrated in FIG. 3 includes delivering, by nozzles 44A, 44B of material deposition head 34, feedstock material 20 to surface 24 of substrate 26 (60). As discussed above, substrate 26 may include a metal, alloy, and/or ceramic substrate, and feedstock material 20 may include the same or different metal, alloy, and/or ceramic material. The metal, alloy, and/or ceramic of substrate 26 may be the same as or different than the metal, alloy, and/or ceramic of feedstock material 20. In some examples, delivering feedstock material 20 (60), may include controlling, for example, by computing device 12, a material flux of feedstock material 20. Controlling the material flux of feedstock material 20 may include controlling a feed rate of the metal, alloy, and/or ceramic of feedstock material 20 out of delivery nozzles 44A and 44B. For example, the feed rate may include a powder feed rate, a wire feed rate, or a gas (e.g., carrier gas) feed rate. Feedstock material 20A delivered by delivery nozzle 44A may be the same or different as feedstock material 20B delivered by delivery nozzle 44B.

During the delivery of feedstock material 20 (60), computing device 12 may control the position of deposition head 30 relative to substrate 26, e.g., so that deposition head 30 moves along toolpath T relative to surface 24 of substrate. For example, computing device 12 may move deposition head 30 relative to surface 24 in a linear or non-linear direction along the plane of the x-y axes. Additionally, or alternatively, computing device 12 may move deposition head 30 relative to surface 24 along the z-axis to control the working distance of deposition head 30.

Although not shown in FIG. 3, along with controlling the delivery of feedstock material via material deposition head 34, computing device 12 may also control laser head 32 to direct energy 27 toward a volume of feedstock material 20 (e.g., material distribution volume 21) to join at least some of feedstock material 20 to substrate 26 to form component 22. In some examples, computing device 12 may control at least one of the instantaneous power, peak power or intensity, power pulsing, average beam power, a peak beam power density, a beam heat input, travel speed, wavelength, direction, or orientation of the delivered directed energy by laser head 32. In some examples, computing device 12 may control parameters that affect one or more of an area of energy incident on surface 24 (e.g., an energy spot size), a flux of energy per unit area incident on surface 24 (e.g., an energy spot power), a rate of heating of feedstock material 20 and/or substrate 26, a rate of cooling of feedstock material 20 and/or substrate 26, and/or a rate of material accumulation on surface 24 (e.g., a build-rate). For example, a power of laser 27 may be maintained between about 50 W and about 1000 W. An energy spot size may be selected to achieve a peak power density on the order of about $10^3$ W/cm$^2$ to about $10^6$ W/cm$^2$. Travel speed may be selected to limit linear heat input to between about 1 J/mm to about 500 J/mm, where heat input is the ratio of the laser power in Watts to the travel speed in mm/s. In some examples, controlling one or more control parameters of laser head 32, such as those described above, may affect the microstructure, mechanical properties, and/or hardness of the deposited feedstock material 20 that forms track 23.

As shown in FIG. 3, computing device 12 may also control the rotation of material deposition head 34 about axis 42 (62). For example, computing device 12 may control drive motor 40 to rotate material deposition head 34 about axis 42, which may change the radial position of delivery nozzles 44A, 44B relative to axis 42 in the toolpath T direction. In some examples, computing device 12 may rotate material deposition head 34 about axis 42 while feedstock material 20 is being delivered towards surface 24 and/or while directed energy in the form of laser 27 is being delivered. Additionally, or alternatively, computing device 12 may rotate material deposition head 34 about axis 42 while feedstock material 20 is not being delivered and/or directed energy in the form of laser 27 is not being delivered, e.g., by alternating between material and/or energy delivery and rotation of material deposition head 34. In some examples, computing device 12 may rotate material deposition head 34 about axis 42 while deposition head 34 is moved relative to substrate 26, e.g., while moving along toolpath T and/or along z-axis. Additionally, or alternatively, computing device 12 may rotate material deposition head 34 about axis 42 when material deposition head 34 is substantially stationary relative to substrate 26.

Computing device 12 may control material deposition head 34 to rotate any suitable amount. In some examples, the maximum rotation of material deposition head 34 may be greater than zero degrees, such as, greater than about 90 degrees, greater than about 180 degrees, greater than about 270 degrees, about 360 degrees, or greater than about 360 degrees. The rotation within the range of maximum rotation may be in a continuous (e.g., infinitely variable or not limited to steps) or periodic manner (e.g., a stepwise manner). As described herein, the rotation of deposition head 14 may change the position of nozzles 44A and 44B, e.g., relative to a toolpath T and/or substrate 26.

In some examples, the degree of rotation may depend on the relative positions of delivery nozzles 44A and 44B about axis 42. For example, for an example deposition head include two nozzle 44A and 44B positioned directly across from each other relative to axis 42 (e.g., 180 degrees apart) such as that shown in FIG. 2, computing device 12 may selectively rotate material deposition head 34 up to +/−180 degrees. Likewise, for an example material deposition head including four delivery nozzles evenly spaced apart 90 degrees from each other, computing device 12 may selectively rotate material deposition head 34 up to +/−90 degrees. In other examples, material deposition head 34 may be configured to rotate about axis 42 more than the relative spacing between adjacent delivery nozzles, e.g., for examples in which different feedstock materials are delivered from the respective delivery nozzles.

Computing device 12 may rotate material deposition head 34 to control material distribution volume 21 of delivered feedstock material 20 (62). For example, computing device 12 may rotate material deposition head 34 such that the size, shape, and/or powder concentration gradient within material distribution volume is substantially constant, e.g., for linear or non-linear toolpaths. In some examples, computing device 12 may rotate material deposition head 34 so that the resulting material distribution volume 21 provides for asymmetric or symmetric build up for track 23. For example, material deposition head 34 may be selectively rotated so that track 23 is substantially symmetric in build height (e.g., where the height of track 23 in the z-direction is substantially constant across its width in the x-direction) for linear or non-linear (e.g., curvilinear) toolpaths. Conversely, material deposition head 34 may be selectively rotated so that track 23 is asymmetric in build height (e.g., where the height of track 23 in the z-direction varies across its width in the x-direction) for linear or non-linear (e.g., curvilinear) toolpaths. In an example in which material deposition head 34 is configured to deliver feedstock material 20 in the form of a wire or filament, material deposition head 34 may be selectively rotated so the orientation of the wire or filament relative to toolpath T is maintained for a non-linear (e.g., curvilinear) toolpath. For example, when following a non-linear toolpath, material deposition head 34 may be rotated when moving along the toolpath so that the wire or filament is "pushed" or "pulled" along a direction that is substantially parallel to the non-linear toolpath.

In some examples, deposition head 34 may be controlled to provide for a preferential building of one material (e.g., in a preferential orientation within a track or bead) in an example in which deposition head 34 deposits different material from different delivery nozzles. For example, when nozzle 44A delivers a first feedstock material and nozzle 44B delivers a second feedstock material different from the first material, computing device 12 may selectively rotated deposition head 34 such that feedstock material 20A is maintained on left or right side or the center of track 23 when delivery head 34 is moved relative to substrate 26 along toolpath T (e.g., where toolpath T is linear or curvilinear).

Figure 4:
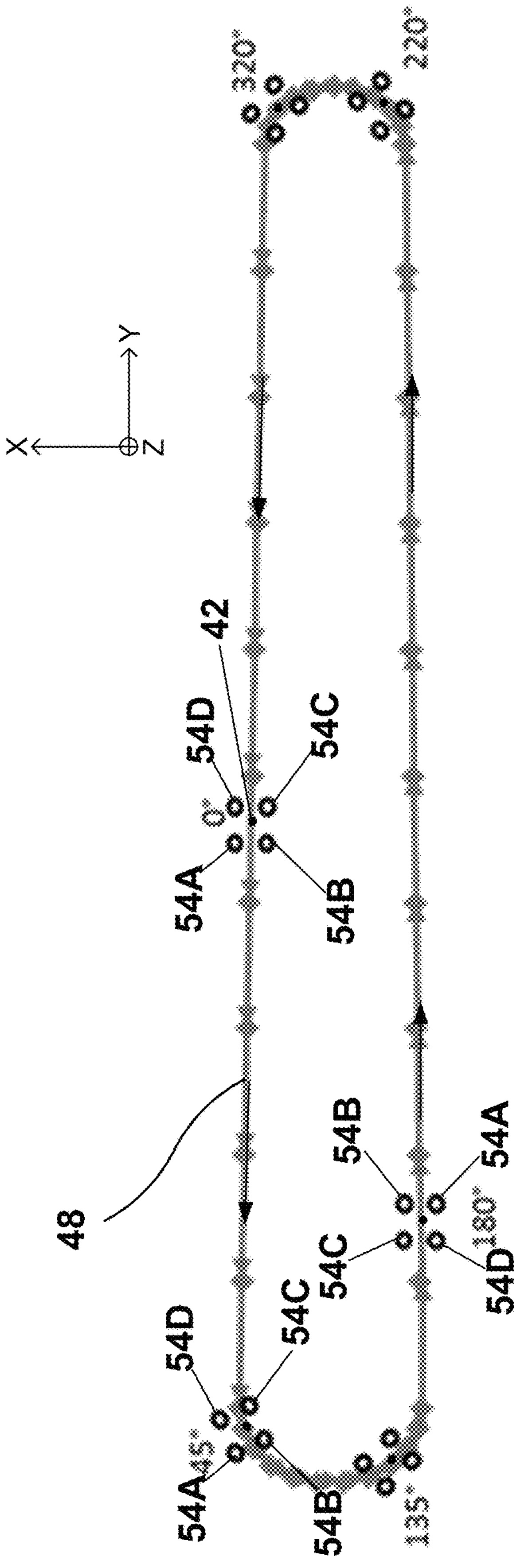
FIG. 4 is a schematic diagraph illustrating the operation of a rotatable deposition head while traveling along an example toolpath.

FIG. 4 is a schematic diagraph illustrating, from a plan view, representation of the operation of a rotatable deposition head while traveling along an example toolpath 48 during an additive manufacturing process. As shown, toolpath 48 is a non-linear (e.g., curvilinear) toolpath roughly in the form of an elongated oval. In some examples, toolpath 48 may generally correspond to the outer boundary or contour of an airfoil. Also shown are the position of four delivery nozzles 54A-54D relative to toolpath 48. Delivery nozzles 54A-54D may be substantially similar to that of delivery nozzles 44A and 44B of material deposition head 34 but with four nozzles being evenly distributed about axis 42 rather than two delivery nozzles.

The schematic of FIG. 4 is representative of an example in which the delivery nozzles 54A-54D rotate about axis 42 (e.g., laser axis and/or central axis) to dynamically adapt the nozzle position to the geometry of the deposition. As the head travels in the x-y axis plane, computing device 12 control material deposition head 34 such that nozzles 54A-54D are rotated about the z-axis, e.g., to maintain relative alignment with the x-y moves along toolpath 48.

For example, at a first location "0°" on toolpath 48, delivery nozzle 54A is at a 315-degree position, nozzle 54B is at a 45-degree position, nozzle 54C is at a 135-degree position, and nozzle 54D is at a 225-degree position. As the material deposition head is moved along curved toolpath 48 to second location "45°", the material deposition head may be rotated about axis 42 approximately forty-five (45) degrees compared to the first location such that nozzles 54A-54D are maintained at 315, 45, 135, and 225 degrees, respectively, despite the curved nature of the toolpath. Likewise, when the material deposition head travels along tool path to third location "135°", the material deposition head may be rotated about axis 42 approximately 135 degrees compared to the first location such that nozzles 54A-54D are maintained at 315, 45, 135, and 225 degrees, respectively, despite the curved nature of the toolpath. Similarly, when the material deposition head travels along tool path to a fourth location "180°", the material deposition head may be rotated about axis 42 approximately 180 degrees compared to the first location such that nozzles 54A-54D are maintained at 315, 45, 135, and 225 degrees, respectively, despite the curved nature of the toolpath. Using such a technique, computing device 12 may maintain the radial position of nozzles 54A-54D relative to toolpath 48 throughout the entire toolpath shown in FIG. 4. In some examples, by rotating the material deposition head about axis 42 in such a manner, the material distribution volume 21 may be substantially the same along toolpath 48 despite the curvilinear path. Furthermore, in examples in which some of nozzles 54A-54D deliver a first feedstock material and other of nozzles 54A-54D delivery a second feedstock material, the position of the respective nozzles relative toolpath 48 and/or central axis 42 may be maintained along the entire curvilinear toolpath 48 shown in FIG. 4.

While FIG. 4 illustrates an example in which the position of nozzles 54A-54D is maintained along the entire toolpath 48, in other examples, a similar process may be employed, e.g., to change one or more properties of the material distribution volume 21 resulting from radial position of nozzles 54A-54D. For example, at one more locations along toolpath 48, computing device 12 may rotate the material deposition head to change the position of nozzles 54A-54D from the 315, 45, 135, and 225 degree positions show in FIG. 4 to a different orientation, such as 0, 90, 180, and 270 degree positions for nozzles 54A-54D, respectively. Such a rotation may adjust the material distribution volume 21, for example, to change the mass capture by the corresponding melt pool from a substantially symmetric capture to a substantially asymmetric capture, or vice versa. In some examples, such control may be desirable to selectively provide a preferential build (e.g., by using nozzles with different flow rates that are selectively moved relative to a toolpath by rotating the deposition head) to change the build of track 23.

The techniques described in this disclosure may be implemented, at least in part, in hardware, software, firmware, or any combination thereof. For example, the technique may be performed using computer software and hardware configured to determine process parameters, tool path design, or both as a function of time based on data obtained through process monitoring and/or process modeling. In some examples, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims and clauses.

Clause 1. A method for additive manufacturing, the method comprising: delivering, via one or more delivery nozzles of a deposition head, a feedstock material to a substrate, wherein the delivered material defines a material distribution volume on and/or adjacent the substrate; and rotating the deposition head about an axis to control the material distribution volume, wherein the rotation of the deposition head adjusts a position of the one or more delivery nozzles of the deposition head relative to the substrate.

Clause 2. The method of clause 1, wherein the deposition head is configured to move along a toolpath for delivery of the feedstock material, and wherein rotating the deposition head about the axis comprises rotating the deposition head about an axis that is substantially orthogonal to the toolpath to adjust the position of the one or more delivery nozzles of the deposition head relative to the substrate.

Clause 3. The method of clauses 1 or 2, wherein the deposition head is configured to move along a non-linear toolpath for delivery of the feedstock material, and wherein rotating the deposition head about the axis to control the material distribution volume comprises rotating the deposition head about the axis to substantially maintain a position of the one or more delivery nozzles relative to the non-linear toolpath.

Clause 4. The method of clause 3, wherein the rotation of the deposition head to maintain a position of the one or more delivery nozzles relative to the non-linear toolpath controls the material distribution volume to be substantially constant relative to the non-liner toolpath.

Clause 5. The method of any one of clauses 1-4, further comprising moving the deposition head relative to the substrate along a toolpath while delivering the feedstock material to the surface of the substrate via the one or more delivery nozzles, wherein moving the deposition head relative to the substrate comprises moving at least one of the deposition head or substrate in at least one of an x, y, or z axis.

Clause 6. The method of any one of clauses 1-5, wherein rotating the deposition head about the axis comprising rotating the deposition head about the axis while delivering the feedstock material to the surface of the substrate.

Clause 7. The method of any one of clauses 1-6, wherein the one or more delivery nozzles comprises a plurality of delivery nozzles.

Clause 8. The method of clause 7, wherein the feedstock material comprises a first feedstock material and a second feedstock material, wherein a first delivery nozzle of the plurality of delivery nozzles delivers the first feedstock material and a second delivery nozzle of the plurality of delivery nozzles delivers the second feedstock material.

Clause 9. The method of clause 8, wherein the deposition head is configured to move along a toolpath for delivery of the feedstock material, and wherein rotating the deposition head about the axis to control the material distribution volume comprises maintaining a position of the first delivery nozzle and the second delivery nozzle relative to the toolpath during delivery of the first feedstock material and second feedstock material.

Clause 10. The method of any one of clauses 1-9, wherein rotating the deposition head about the axis comprises rotating the deposition head about a central longitudinal axis of the deposition head.

Clause 11. The method of any one of clauses 1-10, wherein the substrate maintains a substantially fixed position during the delivery of the feedstock material and the rotation of the deposition head.

Clause 12. The method of any one of clauses 1-11, wherein the feedstock material comprises a powder.

Clause 13. The method of any one of clauses 1-12, wherein the feedstock material comprises a filament.

Clause 14. The method of any one of clauses 1-13, further comprising melting the delivered feedstock material via an energy delivery device.

Clause 15. The method of clause 14, wherein the energy delivery device comprises a laser.

Clause 16. The method of clause 15, wherein rotating the deposition head about an axis to control the material distribution volume comprises rotating the deposition head about an energy delivery axis of the laser.

Clause 17. An additive manufacturing system comprising: an energy delivery device; a deposition head including one or more delivery nozzles configured to deliver a feedstock material; and a computing device, wherein the computing device is configured to: control the deposition head to deliver a feedstock material to a substrate via the one or more delivery nozzles, wherein the delivered material defines a material distribution volume on and/or adjacent the substrate; and control rotation of the deposition head about an axis to control the material distribution volume, wherein the rotation of the deposition head adjusts a position of the one or more delivery nozzles of the deposition head relative to the substrate.

Clause 18. The system of clause 17, wherein the deposition head is configured to move along a toolpath for delivery of the feedstock material, and wherein the computing device is configured to control the rotation of the deposition head about an axis that is substantially orthogonal to the toolpath to adjust the position of the one or more delivery nozzles of the deposition head relative to the substrate.

Clause 19. The system of clauses 17 or 18, wherein the deposition head is configured to move along a non-linear toolpath for delivery of the feedstock material, and wherein the computing device is configured to control the rotation of the deposition head about the axis to substantially maintain a position of the one or more delivery nozzles relative to the non-linear toolpath.

Clause 20. The system of clause 19, wherein the rotation of the deposition head to maintain a position of the one or more delivery nozzles relative to the non-linear toolpath controls the material distribution volume to be substantially constant relative to the non-liner toolpath.

Clause 21. The system of any one of clauses 17-20, wherein the computing device is configured to control movement of the deposition head relative to the substrate along a toolpath while delivering the feedstock material to the surface of the substrate via the one or more delivery nozzles, wherein the movement of the deposition head relative to the substrate comprises movement of at least one of the deposition head or substrate in at least one of an x, y, or z axis.

Clause 22. The system of any one of clauses 17-21, wherein the computing device is configured to control the rotation of the deposition head about the axis while feedstock material is delivered to the surface of the substrate.

Clause 23. The system of any one of clauses 17-22, wherein the one or more delivery nozzles comprises a plurality of delivery nozzles.

Clause 24. The system of clause 23, wherein the feedstock material comprises a first feedstock material and a second feedstock material, wherein a first delivery nozzle of the plurality of delivery nozzles delivers the first feedstock material and a second delivery nozzle of the plurality of delivery nozzles delivers the second feedstock material.

Clause 25. The system of clause 24, wherein the computing device is configured to control movement of the deposition head along a toolpath for delivery of the feedstock material, and wherein the computing device is configured to control the deposition head to maintain a position of the first delivery nozzle and the second delivery nozzle relative to the toolpath during delivery of the first feedstock material and second feedstock material.

Clause 26. The system of any one of clauses 17-25, wherein the computing device is configured to control the deposition head to rotate about a central longitudinal axis of the deposition head.

Clause 27. The system of any one of clauses 17-26, wherein the substrate maintains a substantially fixed position during the delivery of the feedstock material and the rotation of the deposition head.

Clause 28. The system of any one of clauses 17-27, wherein the feedstock material comprises a powder.

Clause 29. The system of any one of clauses 17-28, wherein the feedstock material comprises a filament.

Clause 30. The system of any one of clauses 17-29, wherein the computing device is configured to control the energy delivery device to deliver energy to melt the delivered feedstock material.

Clause 31. The system of clause 30, wherein the energy delivery device comprises a laser.

Clause 32. The system of clause 31, wherein the computing device is configured to control the deposition head to rotate about an energy delivery axis of the laser.

What is claimed is:

1. A method for additive manufacturing, the method comprising:

setting a working distance of a deposition head to a substrate, delivering, via a plurality of delivery nozzles of the deposition head, a feedstock material to a substrate, wherein the delivered material defines a material distribution volume on and/or adjacent the substrate, wherein the plurality of delivery nozzles are displaced from and straddling a central longitudinal axis of the deposition head, and wherein a focal distance of the plurality of nozzles is greater than the working distance of the deposition head to the substrate; and rotating the deposition head about the central longitudinal axis of the deposition head to control the material distribution volume, wherein the rotation of the deposition head adjusts a position of the plurality of delivery nozzles of the deposition head relative to the substrate, wherein the deposition head is configured to move along a non-linear toolpath for delivery of the feedstock material, and wherein rotating the deposition head about the central longitudinal axis comprises:

rotating the deposition head about an axis to maintain the position of the plurality of delivery nozzles of the deposition head in a first deposition head orientation relative to the non-linear toolpath throughout a first time period, such that at least one delivery nozzle of the plurality of delivery nozzles is on each side of the non-linear toolpath to control the material distribution volume to be constant relative to the non-linear toolpath to maintain an asymmetric mass capture by a melt pool, and rotating the deposition head to a second deposition head orientation that is different than the first deposition head orientation to transition from the asymmetric mass capture by the melt pool to a symmetric mass capture by a melt pool, and rotating the deposition head to maintain the plurality of delivery nozzle of the deposition head in the second deposition head orientation throughout a second time period that is different than the first time period.

2. The method of claim 1, further comprising delivering the feedstock material to a surface of the substrate simultaneously to rotating the deposition head about the central longitudinal axis.

3. The method of claim 1, wherein the feedstock material comprises a first feedstock material and a second feedstock material, wherein a first delivery nozzle of the plurality of delivery nozzles delivers the first feedstock material and a second delivery nozzle of the plurality of delivery nozzles delivers the second feedstock material.

4. The method of claim 1, wherein the substrate maintains a fixed position during the delivery of the feedstock material and the rotation of the deposition head.

5. The method of claim 1, further comprising melting the delivered feedstock material via an energy delivery device.

6. The method of claim 5, wherein the energy delivery device comprises a laser.

7. The method of claim 6, wherein rotating the deposition head about the central axis to control the material distribution volume comprises rotating the deposition head about an energy delivery axis of the laser.

8. The method of claim 1, wherein the plurality of delivery nozzles comprises four delivery nozzles.

9. The method of claim 8, wherein, in the first deposition head orientation, the four delivery nozzles are maintained at positions of 315-degrees, 45-degrees, 135-degrees, and 225-degrees relative to the non-linear toolpath.

10. The method of claim 9, wherein, in the second deposition head orientation, the four delivery nozzles are maintained at positions of 0-degrees, 90-degrees, 180-degrees, and 270-degrees relative to the non-linear toolpath.

11. An additive manufacturing system comprising:

an energy delivery device;

a deposition head including a plurality of delivery nozzles configured to deliver a powder feedstock material, wherein:

the deposition head defines a working distance between the deposition head and a substrate, the plurality of delivery nozzles define a focal distance of the feedstock material, wherein the focal distance is greater than the working distance, the plurality of delivery nozzles are displaced from and straddling a central longitudinal axis of the deposition head, and wherein the deposition head is configured to move along a toolpath that includes a linear segment and a non-linear segment for delivery of the feedstock material; and a computing device, wherein the computing device is configured to:

control the deposition head to deliver the powder feedstock material to the substrate via the plurality of delivery nozzles, wherein the delivered material defines a powder distribution volume at a melt pool on the substrate; and control rotation of the deposition head about the central longitudinal axis to control the powder distribution volume, wherein the computing device is configured to control rotation of the deposition head to:

maintain a position of the plurality of delivery nozzles of the deposition head in a first deposition head orientation relative to the toolpath throughout a first time period where the deposition head is travelling along the linear segment such that at least one delivery nozzle of the plurality of delivery nozzles is on each side of the linear segment of the toolpath rotate the deposition head to a second deposition head orientation diamond position where at least one delivery nozzle is aligned with a vector of movement of the toolpath, and maintain the deposition head in the second deposition head orientation throughout a second time period where the deposition head is travelling along the non-linear segment to maintain a constant track width of the powder feedstock material through the non-linear segment.

12. The additive manufacturing system of claim 11, wherein the plurality of delivery nozzles comprises four delivery nozzles.

13. A method for additive manufacturing, the method comprising:

setting a working distance of a deposition head to a substrate, delivering, via a plurality of delivery nozzles of the deposition head, a powder feedstock material to a substrate, wherein the delivered material defines a powder distribution volume at a melt pool on the substrate, wherein the plurality of delivery nozzles are displaced from and straddling a central longitudinal axis of the deposition head, and wherein a focal distance of the plurality of nozzles is greater than the working distance of the deposition head to the substrate; and moving the deposition head along a toolpath comprising a linear segment and a non-linear segment;

while moving the deposition head along the linear segment, maintaining the deposition head in a first orientation relative to the toolpath wherein the plurality of delivery nozzles straddle the toolpath at angular offsets to a vector of movement, and while moving the deposition head along the non-linear segment, rotating the deposition head about the central longitudinal axis of the deposition head to a second orientation relative to the toolpath to transition the plurality of delivery nozzles to a diamond position where at least one nozzle is aligned with the vector of movement to maintain a constant track width of the delivered powder feedstock material through the non-linear segment.

* * * * *